United States Patent Office 3,598,721
Patented Aug. 10, 1971

3,598,721
GASOLINE PRODUCING PROCESS
Vladimir Haensel, Hinsdale, Ill., assignor to Universal
Oil Products Company, Des Plaines, Ill.
No Drawing. Filed June 2, 1969, Ser. No. 829,770
Int. Cl. C10g 23/00
U.S. Cl. 208—89
7 Claims

ABSTRACT OF THE DISCLOSURE

High octane gasoline blending components are produced from catalytically-cracked cycle oils. A substantially sulfur- and nitrogen-free cycle oil is initially hydrogenated in contact with a non-acidic catalytic composite, and the hydrogenated product effluent is subjected to non-catalytic, hydrogenative thermal cracking.

APPLICABILITY OF INVENTION

The present invention is directed toward a combination process for producing high octane rating gasoline boiling range components, from condensed-ring aromatic hydrocarbons. More specifically, the process involves the hydrogenation of a catalytically-cracked cycle oil, rich in condensed-ring aromatics, followed by hydrogenative thermal cracking. An essential feature of the combination process resides in the use of a particular catalytic composite to effect the hydrogenation of the cycle oil. In order to prevent molecular rearrangement during the hydrogenation step, which can lead to even more highly condensed aromatic structures, the catalytic composite is "non-acidic." In employing the term "non-acidic," in the present specification as well as the appended claims, it is intended to connote a catalytic composite to which acid-acting components are not intentionally added, and which catalytic composite may have its insehent acid-function characteristics purposely attenuated, or inhibited.

The so-called light cycle oils, resulting from a catalytic cracking process, generally boil in the range of about 400 F. to about 700° F., or more, and are notoriously rich in polycyclic, or condensed-ring aromatic hydrocarbons. Light cycle oils characteristically consist of more than 50.0% by volume of aromatics, and often as much as 80.0% by volume. A considerable quantity of these condensed-ring aromatics are of the simpler naphthenic and anthracenic type, as well as alkyl-substituted derivatives, as indicated in the following structural formulae:

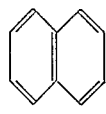

(1)

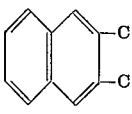

(2)

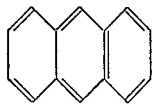

(3)

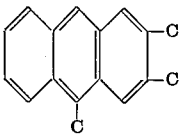

(4)

More complicated condensed-ring structures would include phenanthrene, and its alkyl-substituted derivatives, pyrene, and its alkyl-substituted derivatives and, coronene, and its alkyl-substituted derivatives. These are shown in the following structural formulae:

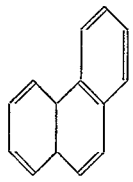

(5)

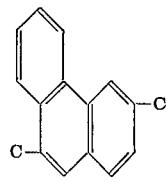

(6)

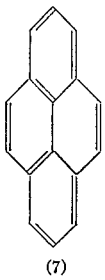

(7)

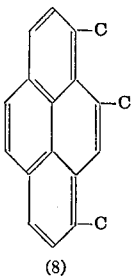

(8)

Current methods of converting a cycle oil, derived from catalytic cracking, generally consist of subjecting the cycle oil to a treatment to remove nitrogen and sulfur-containing compounds, followed by a processing technique at a lower temperature to catalytically hydrocrack the "clean" cycle oil into gasoline. Both operations generally involve the use of a combined acid/hydrogenation dual-function catalyst, such that substantial molecular rearrangements of the hydrocarbons occur during the reaction. In examining the composition of the cycle oil, it has been found to contain substantial quantities of both 2-ring, as well as 3-ring condensed aromatics. The higher-boiling fractions contain even more highly condensed structures having four, five and six aromatic nuclei. Since the molecular rearrangement reactions are competing with the desired hydrogenation reactions, as well as sulfur and nitrogen removal reactions, the charge to the hydrocracking reaction zone still contains condensed-ring aromatics which actually act to poison the activity function of the hydrocracking catalytic composite. Furthermore, such condensed-ring aromatics are subject to further condensation such that the catalytic composite becomes coated with a high molecular weight, hydrogen-poor carbonaceous residue.

In the present process, the cycle oil is initially subjected to catalytic hydrorefining for the purpose of effecting sulfur and nitrogen removal. The hydrorefining technique is effected at conditions such that further condensation of the polynuclear aromatics, as well as hydrocracking, are not fostered to a great extent, the operating conditions particularly including a maximum catalyst bed temperature of from 500° F. to about 650° F. The substantially sulfur- and nitrogen-free hydrorefined product effluent is then subjected to hydrogenation, in contact with the non-acidic catalyst, and at conditions including a maximum catalyst bed temperature in the range of 550° F. to about 800° F. At such conditions, and in the presence of the non-acidic catalyst, molecular rearrangement reactions are not promoted, and there is no competition for the catalytically active sites with respect to effecting the desired saturation of the condensed-ring aromatics.

A typical structure of a hydrogenation component of the "clean" cycle oil may be represented by the following structural formula:

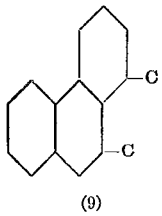

(9)

If this type of condensed structure is subjected to catalytic hydrocracking, the final product generally consists of equilibrated paraffin mixtures rich in mono-methylated paraffins, along with minor amounts of di-methylated paraffins and normal paraffins. In addition, a substantial quantity of naphthenes are formed during the hydrocracking operation, and the product contains both $C_6$-ring naphthenes and $C_5$-ring naphthenes, with the latter being in the greater proportion. In accordance with the process of my invention, wherein the hydrogenated cycle oil is subjected to non-catalytic thermal cracking, in the presence of hydrogen, the product effluent will be rich in high octane blending components resulting from the formation of highly branched compounds, and cyclohexanes, as indicated by the following equation:

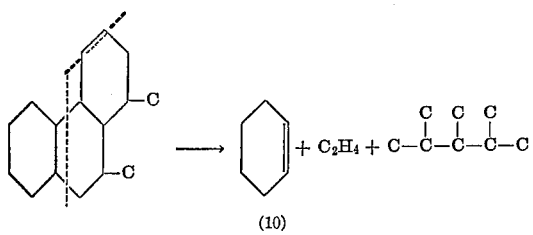

(10)

Thus, the product from the non-catalytic, hydrogenative thermal cracking of the hydrogenated cycle oil fraction contains appreciable quantities of tri- and tetra-substituted paraffins. The reaction is carried out in the presence of hydrogen in order to saturate the reaction products as they are formed. Through the utilization of my invention, the condensed-ring aromatic hydrocarbons do not exist in an atmosphere conducive to further condensation and the attendant formation of heavy carbonaceous material onto the catalytic composite.

OBJECTS AND EMBODIMENTS

An object of the present invention involves providing a process for the conversion of condensed-ring aromatics into lower-boiling, gasoline boiling range hydrocarbons. A corollary objective is to produce high octane rating gasoline boiling range hydrocarbons, suitable for use as motor fuel blending components.

Another object is to provide an integrated catalytic and non-catalytic combination process capable of converting condensed-ring aromatics without suffering the detrimental effects respecting loss of catalytic activity and the formation of carbonaceous material.

Therefore, in a broad embodiment, the present invention involves a process for converting condensed-ring aromatics into lower-boiling, gasoline range hydrocarbons, which process comprises catalytically hydrogenating said aromatics, in contact with a non-acidic catalyst, and subjecting the resulting hydrogenated effluent to hydrogenative thermal cracking.

A more specific embodiment of my invention involves a process for effecting the conversion of a sulfurous cycle oil, containing condensed-ring aromatics, to lower-boiling, gasoline boiling range hydrocarbons which comprises the steps of: (a) hydrorefining said cycle oil in contact with a hydrorefining catalyst, at hydrorefining conditions selected to convert sulfurous and nitrogenous compounds into hydrocarbons, hydrogen sulfide and ammonia; (b) separating the resulting hydrofined effluent to provide a normally liquid, substantially sulfur- and nitrogen-free condensed-ring aromatic concentrate; (c) hydrogenating said aromatic concentrate, in contact with a non-acidic catalyst, at hydrogenating conditions including a maximum catalyst temperature in the range of about 550° F. to about 800° F., and, (d) subjecting the resulting hydrogenated effluent to thermal cracking at a temperature of about 800° F. to about 1200° F. and in admixture with from 2,000 to about 20,000 s.c.f./bbl. of hydrogen.

Other embodiments of my invention involve the use of preferred operating conditions, catalysts, and their compositions, and various operating techniques. These, as well as other objects and embodiments will be evident from the following, more detailed description of my invention.

SUMMARY OF INVENTION

As hereinbefore set forth, the present invention is primarily directed toward the conversion of condensed-ring aromatic hydrocarbons to produce a high octane motor fuel blending component. The process is especially adaptable to the conversion of catalytically-cracked light cycle oils having an initial boiling point as low as about 400° F., and an end boiling point which may be as high as 700° F., or more. The greater majority of catalytically-cracked cycle oils are not only rich in condensed-ring aromatic hydrocarbons, but are contaminated by the inclusion therein of both nitrogenous and sulfurous compounds. Therefore, the cycle oil is initially subjected to a clean-up operation for the purpose of converting the nitrogenous and sulfurous compounds into hydrogen sulfide, ammonia and normally liquid hydrocarbons. In view of the fact that the clean-up operation generally necessitates the utilization of an acidic catalyst, the process is effected at the relatively low catalyst bed temperature in the range of 500° F. to about 650° F. The pressure imposed upon the hydrorefining reaction zone will generally be within the range of about 500 p.s.i.g. to about 3,000 p.s.i.g., and the hydrogen circulation rate in the range of about 2,000 to about 20,000 s.c.f./bbl. The LHSV (defined as volumes of liquid charge per hour per volume of catalyst disposed within the reaction zone) is about 0.5 to about 10.0, based upon fresh feed only. As hereinbefore set forth, the hydrorefining catalyst must necessarily exhibit a certain degree of acid-acting function in order to crack the hydrocarbon molecules at the sulfur- and nitrogen-carbon bonds. For this reason, I prefer the utilization of a catalytic composite, the carrier material of which comprises alumina and silica with the latter being in a concentration of about 10.0% to about 37.0% by weight. Although other refractory inorganic oxides, including zirconia, boria, hafnia, titania, boron phosphate, etc., may be utilized, the preferred carrier constitutes alumina/silica. The carrier is combined with one or more metallic components, by way of a preferred impregnation technique, selected from the group of metals of Group VI-B and the Iron-Group of the Periodic Table. Thus, suitable metallic components are selected from chromium, molybdenum, tungsten, iron, cobalt, and nickel, with a preferred catalytic composite containing from about 4.0% to about 30.0% by weight of the Group VI-B metal component and from about 0.05 to about 6.0% by weight of the Iron-Group metal component, calculated on the basis of the elemental metals. Although not intended as limiting, specific examples of suitable catalytic composites include 1.8% by weight of nickel and 16.0% by weight of molybdenum, combined with a carrier material of 12.0% by weight of silica and 88.0% by weight of alumina; and, 0.05% by weight of cobalt, 4.2% by weight of nickel and 11.3% by weight of molybdenum, combined with a carrier material of 75.0% by weight of alumina and 25.0% by weight of silica. At the foregoing stated conditions, and in the presence of the Group VI-B/Iron-Group catalyst, the cycle oil charge stock will be converted to a substantially sulfur- and nitrogen-free, condensed-ring aromatic-rich normally liquid product. Furthermore, at the relatively low severity including a maximum catalyst bed temperature of 500° F. to 650° F., very little, if any, molecular rearrangement of the aromatic compounds will be effected.

Following separation of the total hydrorefined product effluent, by any of the well-known means which are thoroughly described in the literature, to provide the normally liquid portion of the product effluent, free from ammonia and hydrogen sulfide, the same is raised in temperature such that the maximum catalyst bed temperature in the hydrogenation zone is in the range of 550° F. to about 800° F., preferably from about 600° F. to about 700° F., and more preferably at least 50° F. higher than in the hydrorefining reaction zone. The charge stock will contact the catalytic composite disposed within the hydrogenation reaction zone at an LHSV of from 0.4 to about 3.0, at a pressure in the range of about 500 p.s.i.g. to about 3,000 p.s.i.g., and a hydrogen circulation rate of from 2,000 to about 20,000 s.c.f./bbl. With respect to both the hydrorefining zone and the hydrogenation reaction zone, the reactions being effected are principally exothermic, and an increasing temperature gradient will be experienced as the charge stock traverses the catalyst bed, preferably in a downward radial flow fashion. In order to control the maximum catalyst bed temperature, virtually the same as the reactor outlet temperature, the utilization of conventional quench streams, either normally liquid, or normally gaseous, introduced at one or more intermediate loci, constitutes a preferred operating technique. It is further preferred to limit the temperature increase in both reaction zones to less than 100° F.

Just as a higher temperature level is required to substantially saturate the condensed-ring aromatics, as distinguished from desulfurization and denitrification, the character of the catalyst must necessarily be different from that disposed within the hydrorefining reaction zone. Since the better hydrogenation catalysts, containing metal components selected from the group of Group VIII noble metals, namely platinum, palladium, iridium, osmium, rhodium and ruthenium, are possessed with an inherent acid-active function, the catalytic composite must necessarily be attenuated. The carrier material, therefore, is preferably one which contains no material possessing an inherent high degree of acid-acting activity. Such a material is alumina in and of itself, being particularly free from a silica component and/or halogen components. The Group VIII noble metal component, combined with the carrier material by way of an impregnating technique, is used in an amount in the range of about 0.1% to about 2.0% by weight. In order to counteract the inherent acid-acting activity exhibited by the noble metals of Group VIII, another catalytic component constitutes from 0.1% to about 5.0% by weight of an alkali metal component or an alkaline-earth metal component. Of these, lithium, potassium and barium are preferred, with lithium appearing to give more advantageous results with respect to suppressing the molecular rearrangement of the aromatic nuclei at the elevated operating severity.

Since very little cracking is observed in the first two reaction zones, the entire product effluent from the hydrogenation zone is introduced into the thermal cracking reaction zone, or coil, at substantially the same temperature as it emanates from the hydrogenation zone. The pressure will, however, be reduced to a level of about 150 p.s.i.g. to about 350 p.s.i.g. The thermal cracked product effluent, is at a temperature of from 875° F. to about 1200° F. and a pressure of about 40 p.s.i.g. to about 100 p.s.i.g. Following separation to recover a hydrogen-rich gaseous phase, which is preferably recycled to combine with the fresh cycle oil charge to the first reaction zone, and to recover the normally liquid gasoline boiling range fraction, the heavier material—i.e. boling above a level of about 400° F.—will be recycled to combine with the total reaction product from the second reaction zone, to provide a combined feed ratio to the thermal reaction coil above about 1.1:1, and generally not higher than about 4.5:1.

DESCRIPTION OF A SPECIFIC EMBODIMENT

A catalytically cracked cycle oil, containing about 70.0% by volume of aromatic hydrocarbons, and contaminated by the presence of about 400 p.p.m. by weight of nitrogen and 0.52% by weight of sulfur, is admixed with hydrogen in an amount of about 10,000 s.c.f./bbl., the mixture contacting a catalytic composite comprising 1.8% by weight of nickel and 16.0% by weight of molybdenum combined with a carrier material of 88.0% by weight of alumina and 12.0% by weight of silica. The catalyst is employed in an amount such that the LHSV therethrough is about 1.5, and the maximum catalyst bed temperature is controlled at a level of 575° F. The pressure is slightly above 1,500 p.s.i.g. The product effluent is separated to provide a substantially hydrogen sulfide- and ammonia-free, hydrogen-rich gaseous phase which is combined with the normally liquid portion of the product effluent as the charge to the hydrogenation reaction zone. The temperature of the mixture is then increased to about 600° F., and the temperature increase in the reaction zone is limited to the extent that the maximum catalyst bed temperature is 700° F.; a hydrogen stream of about 2,000 s.c.f./bbl. is used as a quench stream. The LHSV is about 1.0, and the reaction zone is maintained at a pressure of about 1,500 p.s.i.g. The hydrogenation catalyst is a composite of about 0.750% by weight of a platinum component and about 0.80% by weight of a lithium component, combined with a carrier material consisting essentially of alumina. The total hydrogenation reaction zone product effluent, without separation, is admixed with a sufficient quantity of hydrogen to supplant that consumed within the overall process, the mixture being passed into a thermal cracking reaction zone, or coil, the temperature is increased to a level of about 750° F., and the pressure is decreased to a level of about 350 p.s.i.g. The thermally-cracked product effluent, at a temperature of about 975° F. and a pressure of about 140 p.s.i.g., is subjected to a series of hot flash, cold flash and low-temperature separations, and distillations, in order to provide a normally liquid product effluent, a propane/butane-rich fraction and a hydrogen-rich gaseous phase which is recycled to combine with the fresh cycle oil charge stock to the first, or hydrorefining reaction zone. That portion of the normally liquid thermally cracked product effluent boiling above a temperature of 400° F., is recycled to combine with the total reaction product effluent from the hydrogenation zone, providing a combined liquid feed ratio to the thermal coil of about 1.6.

The foregoing specification indicates the method by which the process of the present invention is effected, and the benefits to be afforded through the utilization thereof.

I claim as my invention:

1. A process for converting condensed-ring aromatics into lower-boiling, gasoline range hydrocarbons which comprises catalytically hydrogenating said aromatics in contact with a supported Group VIII noble metal catalyst containing an alkali or alkaline earth metal component at a temperature of from about 550° F. to about 800° F. and a pressure of from about 500 to about 3000 p.s.i.g., and subjecting the resultant hydrogenated effluent to hydrogen addition thermal cracking in the presence of from 2,000 to about 20,000 s.c.f./bbl. of hydrogen.

2. The process of claim 1 further characterized in that said catalyst comprises an alumina support.

3. The process of claim 2 further characterized in that said catalyst comprises 0.01% to about 2.0% by weight of a platinum or palladium component.

4. A process for converting a sulfurous cycle oil, containing condensed ring aromatics, into lower-boiling, gasoline range hydrocarbons which comprises the steps of:

(a) hydrorefining said cycle oil, in contact with a hydrorefining catalyst composite of a porous carrier material, a Group VI–B metal component and an Iron-Group metal component, at hydrorefining conditions including a pressure of 500 to 3,000 p.s.i.g., a maximum catalyst bed temperature of 500° F. to about 650° F. and a hydrogen circulation rate of 2,000 to about 20,000 s.c.f./bbl. to convert sulfurous and nitrogenous compounds into hydrocarbons, hydrogen sulfide and ammonia;

(b) separating the resulting hydrorefined effluent to provide a normally liquid, substantially sulfur- and nitrogen-free condensed-ring aromatic concentrate;

(c) hydrogenating said aromatic concentrate, in contact with a supported Group VIII noble metal catalyst containing an alkali or alkaline earth metal component at hydrogenating conditions including a maximum catalyst temperature in the range of 550° F. to about 800° F.; and (d) subjecting the resulting hydrogenated effluent to hydrogen addition thermal cracking at a temperature of about 800° F. to about 1200° F. and in admixture with from 2,000 to about 20,000 s.c.f./bbl. of hydrogen.

5. The process of claim 4 further characterized in that said catalyst comprises alumina and 0.01% to about 2.0% by weight of a platinum or palladium component.

6. The process of claim 4 further characterized in that said hydrogenating conditions include a pressure of from 500 to about 3,000 p.s.i.g., an LHSV of from 0.4 to about 3.0, a maximum catalyst temperature of 550° F. to 800° F. and a hydrogen circulation rate of from 2,000 to about 20,000 s.c.f./bbl.

7. The process of claim 6 further characterized in that said maximum catalyst temperature is in the range of 600° F. to about 700° F.

References Cited
UNITED STATES PATENTS

| | | | |
|---|---|---|---|
| 2,865,836 | 12/1958 | Franke et al. | 208—57 |
| 3,083,244 | 3/1963 | Sanford et al. | 260—674 |
| 3,132,089 | 5/1964 | Hass et al. | 208—89 |

DELBERT E. GANTZ, Primary Examiner

R. M. BRUSKIN, Assistant Examiner

U.S. Cl. X.R.

208—57, 107